United States Patent [19]
Pitts

[11] 3,957,500
[45] May 18, 1976

[54] STABILISED ZIRCONIA AND A PROCESS FOR THE PREPARATION THEREOF

[75] Inventor: Frank Pitts, Salford, England

[73] Assignee: Magnesium Elektron Limited, Manchester, England

[22] Filed: Apr. 15, 1974

[21] Appl. No.: 461,232

Related U.S. Application Data

[63] Continuation of Ser. No. 266,735, June 27, 1972, abandoned.

[30] Foreign Application Priority Data
June 29, 1971  United Kingdom............... 30399/71

[52] U.S. Cl. ................................................. 106/57
[51] Int. Cl.² ........................................ C04B 35/48
[58] Field of Search ...................................... 106/57

[56] References Cited
UNITED STATES PATENTS

| | | | |
|---|---|---|---|
| 3,259,585 | 7/1966 | Fitch et al. | 106/57 |
| 3,514,252 | 5/1970 | Levy et al. | 106/57 |
| 3,634,113 | 1/1972 | Fehrenbacher | 106/57 |

*Primary Examiner*—J. Poer
*Attorney, Agent, or Firm*—Karl W. Flocks

[57] ABSTRACT

Stabilised zirconia is obtained by mixing zirconia with an impure yttria concentrate containing 35–70% by weight yttria with the remainder being substantially heavy and light rare earth metal oxides, such concentrate being prepared from a naturally occurring mineral material. Sufficient concentrate is used so that the stabilised zirconia body contains at least 3 mole percent of yttria and heavy rare earth metal oxides.

13 Claims, No Drawings

STABILISED ZIRCONIA AND A PROCESS FOR THE PREPARATION THEREOF

This is a continuation of application Ser. No. 266,735 filed June 27, 1972, now abandoned in favor of the present application.

BACKGROUND OF INVENTION

1. Field of Invention

Because of its very high melting point of 2650°C and its chemical inertness at high temperatures, pure zirconia appears, at first sight, to be very attractive as a material for the preparation of ceramics usable at very high temperatures but dense bodies of pure zirconia undergo a destructive volume change, which is accompanied by a change in structure from monoclinic to tetragonal, at about 1100°C. It is known to reduce this volume change by mixing certain other oxides, such as calcia and magnesia, with zirconia prior to firing the mixture to convert the zirconia to a cubic modification, which is stable between room temperature and the melting point of the mixture. By restricting the additions of these other oxides to about 15 mole% with respect to the zirconia, the melting point of the zirconia is little affected and ceramic bodies of such a "stabilised" zirconia have become well known articles of commerce. However, it is difficult to prepare high density stabilised zirconia bodies when calcia is used as the stabiliser whilst bodies containing magnesia de-stabilise on thermal cycling in the temperature range 1000–1500°C.

2. Description of Prior Art

Other oxides of the general formula $R_2O_3$ are known to be capable of producing the desired cubic modification in the zirconia when added in a quantity of at least 6 mole% with respect to the zirconia. One of the first of these oxides to be discovered to give this effect and the one which has been the subject of the largest number of subsequent investigations is yttria, $Y_2O_3$. These investigations have established that cubic stabilised zirconia containing 6 mole% $Y_2O_3$ can be formed from a mixture of the oxides when heated to 2000°C. These investigations indicated that oxides of other trivalent elements with a similar ionic radius to yttria, i.e. scandium and the rare earth metals from samarium (Atomic No. 62) to lutecium (Atomic No. 71) should also stabilise zirconia in the same modification when added in 6 mole% or greater amounts with respect to the zirconia. More recent investigations have shown that the addition of smaller quantities of yttria to zirconia, for example from 4 up to 6 mole% produce a tetragonal stabilised zirconia which does not undergo any phase transformation at elevated temperatures, that is temperatures ranging up to about 2000°C.

Other developments have shown that ceramics based on yttria stabilised zirconia possess additional useful features. U.S. Pat. No. 3,432,314 describes the preparation of mixtures of very pure zirconia and yttria by controlled hydrolysis of their alkoxides and discloses that these mixtures can be sintered at temperatures as low as 1450°C to give stabilised zirconia ceramics which have nearly theoretical density and which are translucent in thin sections. This United States specification also describes ytterbia and dysprosia stabilised zirconia using the same method of preparation.

It has been found that while yttria is similar to lime in permitting the production of stabilised zirconia ceramics which are resistant to de-stabilisation on thermal cycling, it has the additional advantages that the ceramics produced have superior corrosion resistance, for example, to molten glass, molten metals and titanates, and are better conductors of electricity at elevated temperatures than ceramics prepared from lime-stabilised zirconia.

It is clear that zirconia stabilised with yttria or one of the rare earth metal oxides ytterbia or dysprosia has considerable potential in the production of strong dense ceramics resistant both to temperatures in excess of 2000°C and conditions of extreme corrosion. Pure yttria is a very expensive material since it usually occurs in association with rare earth metal oxides in ores such as monazite or xenotime from which it is only separated by lengthy and hence expensive procedures. Similarly, the rare earth metal oxides ytterbia and dysprosia are usually found in association with other rare earth metal oxides and to obtain them in the pure state is for the same reasons, expensive.

However, these separation procedures generate intermediate products containing 35% to 70% yttria with the remainder consisting substantially of oxides of rare earth metals whose atomic numbers range from 57 to 71.

The rare earth metals are commonly divided into two sub-groups, the cerium or "light" rare earth metal sub-group consisting of elements whose atomic numbers range from 57 to 61, and the yttrium or "heavy" rare earth metal sub-group consisting of rare earth metals whose atomic numbers range from 62 to 71.

It will be noted that yttrium, atomic number 39, is not, itself, a rare earth metal, although it occurs, in nature, in association with rare earth metals.

SUMMARY OF THE INVENTION

It has now been found that zirconia can be stabilised with a concentrate containing yttria and rare earth metal oxides thus obviating the need to prepare pure yttria or a pure heavy rare earth metal oxide.

According to one aspect of the present invention a stabilised zirconia body comprises zirconia and an yttria concentrate containing from 35% to 70% by weight yttria and the remainder consisting substantially of heavy and light rare earth metal oxides, the concentrate being present in a quantity sufficient to provide a total of at least 3 mole% of yttria and heavy rare earth metal oxides in the zirconia body.

By a "stabilised zirconia body" is meant a stabilised zirconia in the form of grains or articles having selected shapes such as bricks, sheets and other shapes usually associated with the ceramic and refractory products industries.

The concentrate may contain in addition to yttria and heavy rare earth metal oxides, light rare earth metal oxides and impurities such as silica, alumina, titania and iron oxide. It is preferred that the concentrate contains at least 50% by weight of yttria plus heavy rare earth metal oxides, not more than 40% by weight, based on the total oxides present, of light rare earth metal oxides, not more than 5% by weight, and preferably not more than 2% by weight, based on the total concentrate of inconsequential impurities.

It is desirable to use a concentrate that is commercially readily available and that has a high yttria plus heavy rare earth metal oxide content. Thus concentrates containing from about 50% to 65% by weight of yttria, from about 30% to about 35% by weight of heavy rare earth metal oxides, from about 2% to 15% by weight light rare earth metal oxides and from about 1% to 5% by weight impurities are usable in the present method. It is, however, possible to use concentrates in which the content of light rare earth metal oxides approaches 40% by weight and the content of impurities is up to 5% by weight, the content of yttria being only about 38% by weight and the content of heavy rare earth metal oxides being about 20% by weight.

It will be appreciated that the degree of stabilisation of zirconia depends upon the mole percentage of yttria and heavy rare earth metal oxides present. Three mole% of yttria plus heavy rare earth metal oxides will give a zirconia sufficiently stabilised, in the tetragonal form, to withstand thermal cycling in the temperature range 800°C to 1600°C and such a stability is suitable for many applications. As the mole percentage of yttria plus heavy rare earth metal oxides is increased so the degree of stabilisation of the zirconia body produced increases. To stabilise zirconia in the cubic form from 6 to 8 mole% of yttria plus heavy rare earth metal oxides is required.

According to another aspect of the invention a process for the production of stabilised zirconia comprises mixing zirconia and an yttria concentrate containing from 35% to 70% yttria and the remainder consisting substantially of heavy and light rare earth metal oxides, the concentrate being present in a quantity sufficient to provide at least 3 mole% of yttria plus heavy rare earth metal oxides and calcining the mixture for a period ranging from 1 hour to 10 hours at a temperature ranging from 900°C to 1500°C.

In one form the process comprises dissolving the concentrate in hydrochloric acid, adding the solution to an aqueous slurry of zirconium basic sulphate, adjusting the pH of the resulting slurry to about 9 to cause co-precipitation of the zirconium, yttrium and the heavy and light rare earth metals as their hydroxides, filtering off the precipitate, washing the precipitate to remove sulphate and chloride ions, drying the washed precipitate and calcining it for a period ranging from 1 hour to 10 hours at a temperature ranging from 900°C to 1500°C.

To form the stabilised zirconia into a desired shape, the zirconia is ground in the presence of water pressed into the desired shape under a pressure of about 11,200 pounds per square inch and sintered for 2 hours at a temperature ranging from 1400°C to 1650°C.

DESCRIPTION OF PREFERRED EMBODIMENTS

So that the invention may be more clearly understood experiments which have been carried out are now described by way of example.

The yttria/earth metal oxide concentrates used in the experiments had the following analyses, the percentages being percentages by weight.

| Oxide | Concentrate I | Concentrate II | Concentrate III |
|---|---|---|---|
| $Y_2O_3$ | 48.6 | 64.0 | 55.5 |
| $La_2O_3$ | 0.4 | 3.5 | 0.4 |
| $CeO_2$ | 2.0 | 0.5 | 1.4 |
| $Pr_6O_{11}$ | — | 0.6 | 0.2 |
| $Nd_2O_3$ | 1.5 | 3.2 | 1.3 |
| $Sm_2O_3$ | 1.5 | 1.4 | 2.0 |
| $Eu_2O_3$ | 1.0 | 0.1 | 0.2 |
| $Gd_2O_3$ | 5.5 | 3.3 | 9.4 |
| $Tb_2O_3$ | 1.0 | 0.9 | 3.2 |
| $Dy_2O_3$ | 16.0 | 7.0 | 15.2 |
| $Ho_2O_3$ | 3.0 | 1.9 | 2.0 |
| $Er_2O_3$ | 4.5 | 6.1 | 3.7 |
| $Yb_2O_3$ | 2.0 | 6.1 | 1.5 |
| $ThO_2$ | — | 0.5 | — |

In a first experiment the yttria/rare earth metal oxides concentrate I was dissolved in 6M hydrochloric acid and the solution added to an aqueous slurry containing the required amount of zirconium, in the form of zirconium basic sulphate, to give a stabilised zirconia product containing a total of 6 mole% yttria and heavy rare earth metal oxides. The pH of the resulting slurry was adjusted to 9 by the addition of aqueous ammonia to cause co-precipitation of yttrium, the rare earth metals and the zirconium as their hydroxides. The mixed hydroxides were filtered off and washed with water until the filtrate was free from sulphate and chloride ions. The mixed hydroxides were dried and then calcined for 1 hour at 900°C. X-ray examination of the resulting product showed it to consist of a single cubic phase.

The calcined product was wet ball-milled until a powder having particle sizes substantially all less than 10 microns was obtained. The powder was dried, pressed into shapes under a pressure of 11,200 pounds per square inch and sintered for 2 hours at a temperature of 1570°C to give shaped bodies which had densities of 5.90 g/cc.

For comparison purposes, yttria stabilised zirconia was prepared from zirconia and 6 mole% of 99.9% pure yttria using co-precipitation and wet ball-milling as the means of mixing and grinding to a fine powder as previously described. The resulting powder was dried, pressed into shapes and sintered in the same manner and under the same conditions as were used for yttria/rare earth metal oxides stabilised zirconia. The resulting shaped bodies were porous and had densities of 4.7g/cc.

In a second experiment calcined zirconium oxide powder containing 99% $ZrO_2$ + $HfO_2$ was mixed wet in a ball-mill with 6 mole% of concentrate II. Milling was continued until the particle sizes were substantially all below 10 microns. The mixed powders were then dried, pressed into shapes under the same pressure as before and sintered in a gas fired furnace for 2 hours at a temperature of 1650°C. The resulting shaped bodies had no apparent porosity and densities of 5.78 g/cc.

In a third experiment 6 mole% of yttria concentrate III was co-precipitated with zirconia to give sulphate and chloride ion free hydroxides in the manner described in the first experiment. The mixed hydroxides were dried and then calcined for 6 hours at 1250°C. The calcined product was wet ball-milled using high density zirconia grinding media with a media:charge ratio of 20:1 for 18 hours. The milled powder was dried and pressed at 11,200 pounds per square inch into small discs having a density of 3.60 g/cc. These discs on sintering for 4 hours at a peak temperature of 1620°C in a natural gas fired kiln gave fired densities of 5.88 g/cc with a firing shrinkage of 15.3%.

These results show that the use of yttria/rare earth metal oxides concentrate as a stabilizing agent give stabilised zirconia bodies of higher fired density then zirconia bodies using 99.9% pure yttria as stabilising agent.

While it is acknowledged as known that certain "heavy" rare earth metal oxides have a stabilising effect on zirconia and that it has been deduced that other "heavy" rare earth metal oxides would have the same stabilising effect their cost of production has prohibited their use as zirconia stabilising agents. It is also known that the "light" rare earth metal oxides either individually or in admixture with one another do not produce with zirconia, a cubic stabilised zirconia.

Although the mechanism is not at present understood the results obtained show that to produce dense, stable bodies of zirconia it is not necessary to use pure yttria or a pure "heavy" rare earth metal oxide. Such bodies can be readily produced using relatively cheap yttria/rare earth metal oxides concentrates. The presence of "light" rare earth metal oxides in the concentrate apparently has no deleterious effect.

I claim:

1. A stabilised zirconis body consisting essentially of zirconia and an impure yttria concentrate containing from 35% to 70% by weight yttria and the remainder consisting substantially of heavy and light rare earth metal oxides and 1 to 5% by weight of impurities, the concentrate being prepared from a naturally occuring mineral material containing yttrium and rare earth metals present in a quantity sufficient to provide a total of at least 3 mole% of yttria and heavy rare earth metal oxides in the zirconia body.

2. A stabilised zirconia body according to claim 1, in which the concentrate is present in a quantity sufficient to provide a total of from 6 to 8 mole% of yttria and heavy rare earth metal oxides in the zirconia body.

3. A stabilised zirconia body according to claim 1, in which the concentrate contains at least 50% by weight of yttria plus heavy rare earth metal oxides, not more than 40% by weight, based on the total oxides present, of light rare earth metal oxides and not more than 2% by weight, based on the total concentrate, of inconsequential impurities.

4. A stabilised zirconia body according to claim 3, in which the concentrate contains from about 50% to about 65% by weight of yttria, from about 30% to about 35% by weight of heavy rare earth metal oxides, and from about 2% to about 15% by weight of light rare earth metal oxides.

5. A stabilised zirconia body according to claim 3, in which the concentrate contains about 38% by weight of yttria, about 20% by weight of heavy rare earth metal oxides, and up to 40% by weight of light rare earth metal oxides.

6. A process for the production of stabilised zirconia comprising preparing an oxide mixture from zirconia and an impure yttria concentrate containing from 35% to 70% yttria and the remainder consisting substantially of heavy and light rare earth metal oxides and 1% to 5% by weight of impurities, the concentrate being prepared from a naturally occurring mineral material containing yttrium and rare earth metals without isolation of pure yttria, the concentrate being present in a quantity sufficient to provide at least 3 mole% of yttria plus heavy rare earth metal oxides and calcining the mixture for a period ranging from 1 hour to 10 hours at a temperature ranging from 900°C to 1500°C.

7. A process according to claim 6, in which the concentrate is present in a quantity sufficient to provide a total of from 6 to 8 mole% of yttria and heavy rare earth metal oxides in the mixture.

8. A process according to claim 6, in which the concentrate contains at least 50% by weight of yttria plus heavy rare earth metal oxides, not more than 40% by weight, based on the total oxides present, of light rare earth metal oxides and not more than 2% by weight, based on the total concentrate, of inconsequential impurities.

9. A process according to claim 8, in which the concentrate contains from about 50% to about 65% by weight of yttria, from about 30% to about 35% by weight of heavy rare earth metal oxides, and from about 2% to about 15% by weight of light rare earth metal oxides and from about 1% to 5% by weight of inconsequential impurities.

10. A process according to claim 8, in which the concentrate contains about 30% by weight of yttria, about 20% by weight of heavy rare earth metal 20% up to 40% by weight of light rare earth metal oxides and up to 5% by weight of inconsequential impurities.

11. A process for the production of stabilised zirconia which comprises dissolving in hydrochloric acid an impure yttria concentrate containing from 35% to 70% yttria and the remainder consisting substantially of heavy and light rare earth metal oxides, and 1–5% impurities the concentrate being prepared from a naturally occurring mineral material containing yttrium and rare earth metals without isolation of pure yttria, adding the hydrochloric acid solution to an aqueous slurry of zirconium basic sulphate, adjusting the pH of the resulting slurry to cause co-precipitation of the zirconium, yttrium and the heavy and light rare earth metals as their hydroxides, filtering off the precipitate, washing the precipitate to remove sulphate and chloride ions, drying the precipitate and calcining the precipitate for a period ranging from 1 to 10 hours at a temperature ranging from 900°C to 1500°C.

12. A process for the production of a stabilised zirconia body, which comprises preparing an oxide mixture from zirconia and an impure yttria concentrate containing from 35% to 70% yttria and the remainder consisting substantially of heavy and light rare earth metal oxides, and 1–5% impurities the concentrate being prepared from a naturally occurring mineral material containing yttrium and rare earth metals without isolation of pure yttria, the concentrate being present in a quantity sufficient to provide at least 3 mole% of yttria plus heavy rare earth metal oxides, calcining the mixture for a period ranging from 1 hour to 10 hours at a temperature ranging from 900° to 1500°C, grinding the calcined mixture in the presence of water, pressing the ground mixture into the desired shape under a pressure of about 11,200 pounds per square inch and sintering the resulting shape for 2 hours at a temperature ranging from 1400°C to 1650°C.

13. A process for the production of a stabilised zirconia body, which comprises dissolving in hydrochloric acid an impure yttria concentrate containing from 35% to 70% yttria and the remainder consisting substantially of heavy and light rare earth metal oxides, and 1–5% impurities the concentrate being prepared from a naturally occurring mineral material containing yttrium and rare earth metals without isolation of pure yttria, adding the hydrochloric acid solution to an aqueous slurry of zirconium basic sulphate, adjusting the pH of the resulting slurry to cause co-precipitation of the zirconium, yttrium and the heavy and light rare earth metals as their hydroxides, filtering off the precipitate, washing the precipitate to remove sulphate and chloride ions, drying the washed precipitate, calcining the precipitate for a period ranging from 1 hour to 10 hours at a temperature ranging from 900° to 1500°C, grinding the calcined mixture in the presence of water, pressing the ground zirconia into the desired shape under a pressure of about 11,200 pounds per square inch and sintering the resulting shape for 2 hours at a temperature ranging from 1400°C to 1650°C.

* * * * *